United States Patent [19]

Baker

[11] Patent Number: 4,812,864
[45] Date of Patent: Mar. 14, 1989

[54] CAMERA AND TWO-ELEMENT VIEWFINDER

[75] Inventor: James G. Baker, Bedford, N.H.

[73] Assignee: Polaroid Corporation, Cambridge, Mass.

[21] Appl. No.: 155,990

[22] Filed: Feb. 16, 1988

[51] Int. Cl.⁴ .................. G03B 13/02; G03B 19/12
[52] U.S. Cl. ...................... 354/224; 354/155; 354/225
[58] Field of Search ............. 354/219, 224, 225, 155; 340/432, 434, 435, 443, 503

[56] References Cited

U.S. PATENT DOCUMENTS

| | | | |
|---|---|---|---|
| 3,690,240 | 9/1972 | Gold | 354/155 |
| 3,735,685 | 5/1973 | Plummer | 354/158 |
| 3,836,931 | 9/1974 | Plummer | 354/155 |
| 3,877,044 | 4/1975 | Plummer | 354/224 |
| 3,887,931 | 6/1975 | Baker | 354/155 |
| 4,723,140 | 2/1988 | Whiteside et al. | 354/219 |

Primary Examiner—A. A. Mathews
Attorney, Agent, or Firm—Francis J. Caufield

[57] ABSTRACT

A two-element viewfinder comprising a mirror distorted in the form of a generalized polynomial shape, an eye lens, and a Fresnel mirror for use in a reflex camera with a taking objective and a reflex mirror.

44 Claims, 3 Drawing Sheets

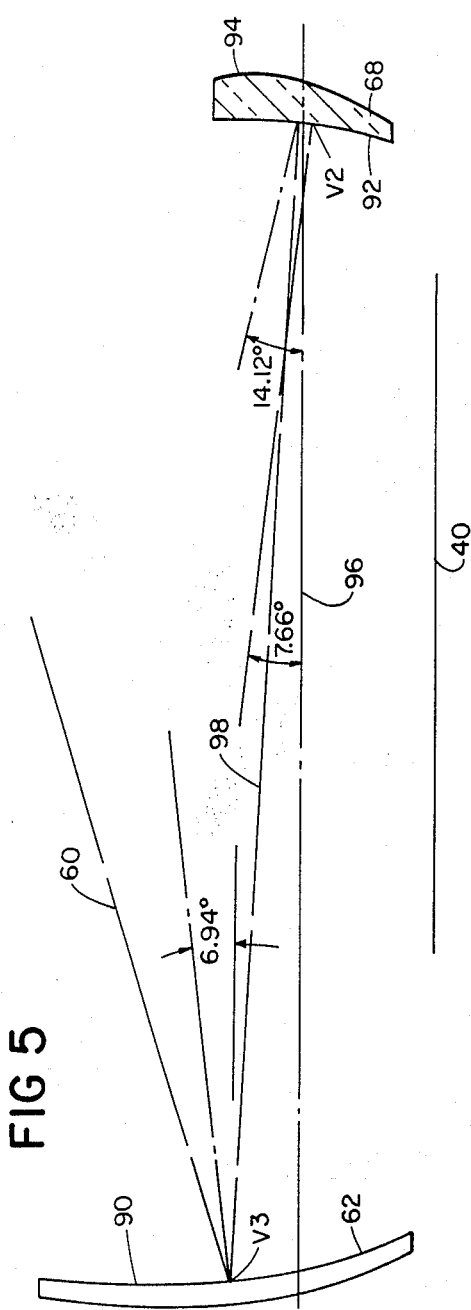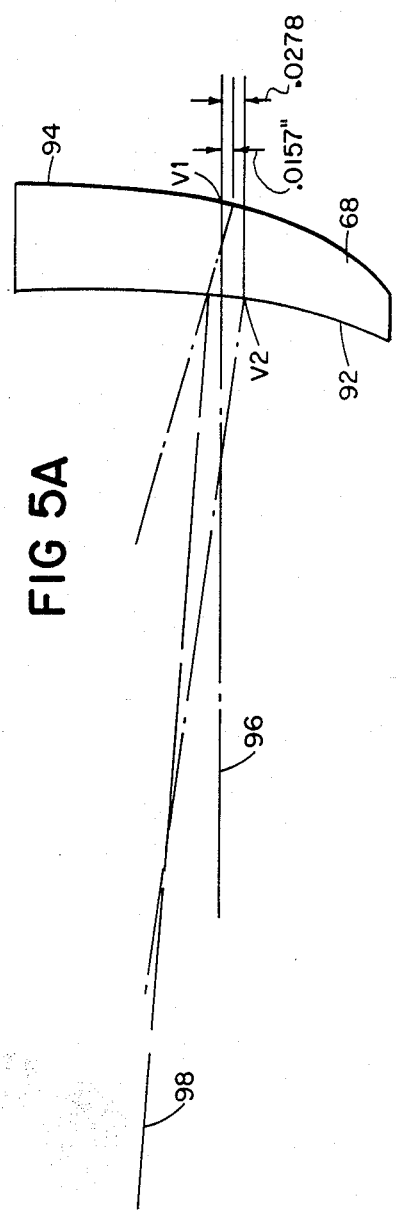

CAMERA AND TWO-ELEMENT VIEWFINDER

BACKGROUND OF THE INVENTION

This invention in general relates to compact, folding, single-lens-reflex cameras for "print photography" and in particular to viewfinders for such cameras.

Cameras for use with film formats of modest size, diagonals of three to five inches more or less, often employ folded optical paths with minimal camera body structure to achieve compactness. In addition, every effort is made to minimize the size of required components or to consolidate their functions in the fewest possible elements wherever possible without sacrificing performance and incurring most penalties.

Several prior-art, single-lens reflex print cameras accept a print film pack in a film compartment at the unit's base. The sensitive surface of the film extends parallel to the axial light rays entering the objective. To permit an observer to view a scene prior to exposure, a fixed diagonal reflex mirror reflects light passing through the objective onto the upper surface of a movable capping plate that overlies the film compartment parallel to the film surface. The capping plate keeps the film compartment impervious to light, and its upper surface serves as a reflective focusing screen. A viewfinder utilized the light reflected by the focusing screen to form an observable image.

For film exposure, the capping plate that keeps the film container safe from unwanted exposure pivots from the film-covering "down" position to a film-exposing diagonal "up" position at which it covers the fixed reflex mirror. In its "up" position, a movable reflex mirror surface on the lower face of the plate reflects light passing from the objective lens onto the film. The objective lens then focuses light onto the film.

In such cameras, viewfinders form erect, unreverted images while compensating for the various oblique reflection surfaces within the imaging chamber and orient the viewfinder itself relative to the image on the focusing screen of the capping plate. U.S. Pat. Nos. 3,783,764 and 3,836,931, assigned to Polaroid Corporation, describe folding cameras whose viewfinders furnish erect, unreverted images, reduce the accommodation required of a viewer, and minimize field tilt. They accomplish this by having the fixed reflex mirror deflect light from the focusing screen out of the imaging chamber into a viewing chamber with a two element viewfinder or a three element viewfinder. In the viewfinder, an aspheric concave mirror reflects the light through an eye-lens having an aspheric surface. The concave mirror is a portion of a surface of revolution about an axis. The meridional cut of the concave mirror is defined mathematically by the expression given in the patents, being first a standard form of conic expression of high eccentricity followed by an array of power series terms.

A similar mathematical expression defines the rear surface of the eye-lens, that is, the surface nearest the eye of the observer, with first the conic expression, next aconic terms of 4th and 6th orders, and last further power series terms through the 6th order.

However, the three element viewfinder adds undesirable complexity and cost to a camera arrangement where space is at a premium while the two element viewfinder gave unacceptable images which resulted in a visual field that "swan" with transverse and longitudinal eye movement.

Therefore, a primary object of this invention is to improve single lens reflex cameras and their viewfinder systems.

Another object of the invention is to improve viewfinders for single lens reflex cameras.

Yet another object of the invention is to improve compact folding single lens reflex print cameras and their viewfinders.

Yet another object of the invention is to avoid the aforementioned deficiencies.

Other objects of the invention in part will be obvious and in part will appear hereinafter. The invention accordingly comprises the apparatus possessing the construction, combination of elements, and arrangement of parts which are exemplified in the following detailed description.

SUMMARY OF THE INVENTION

The invention comprises a two-element viewer having a mirror distorted in the form of a generalized polynomial shape and a eye lens with one aspheric surface and some prismatic power. This arrangement permits observation of the image of the scene formed at the focusing screen of a folding reflex camera by preceding optical components.

The aspheric surface of the lens faces the reflector, and the lens includes a spherical surface directed toward the eye of the observer.

The focusing screen near the image plane of the objective is a Fresnel screen which forms an image of the exit pupil of the objective in space before the distorted mirror. The distorted mirror forms a conjugate image of the prime image on the Fresnel screen in the intervening space between the distorted mirror and the eye lens.

The distorted mirror of the viewer is a reflector having a surface shaped in accordance with the expression:

$$\begin{aligned}Z = \ &-0.2747X^2 - 0.2639Y^2 \\ &+0.0190X^2Y + 0.0145Y^3 \\ &-0.0094X^4 - 0.0251X^2Y^2 + 0.00184Y^4 \\ &-0.0011X^4Y + 0.0252X^2Y^3 + 0.0004Y^5 \\ &+0.0570X^4Y^2 - 0.0204X^2Y^4 - 0.0134Y^6\end{aligned}$$

The aspheric surface of the lens is shaped in accordance with the expression $$\begin{aligned}Z = \ &+0.315X^2 + 0.341Y^2 \\ &+0.276X^2Y + 0.256Y^3 \\ &+0.577X^4 + 1.316X^2Y^2 + 0.654Y^4 \\ &-0.065X^4Y + 0.335X^2Y^3 + 0.216Y^5 \\ &+0.0269X^4Y^2 + 0.049X^2Y^4 - 0.013Y^6\end{aligned}$$

BRIEF DESCRIPTION OF THE DRAWINGS

A complete understanding of the present invention may be gained by considering the following detailed description in conjunction with the accompanying drawings in which identical reference numerals are used to designate the same elements appearing in each figure where:

FIG. 5 is a schematic representation of the viewfinder of the camera in FIGS. 1 to 4 when the camera is in operating position and showing details of the viewfinder elements; and FIG. 5A is an enlarged portion of the viewfinder of FIG. 5.

DETAILED DESCRIPTION OF PREFERRED EMBODIMENTS

Figure 1:
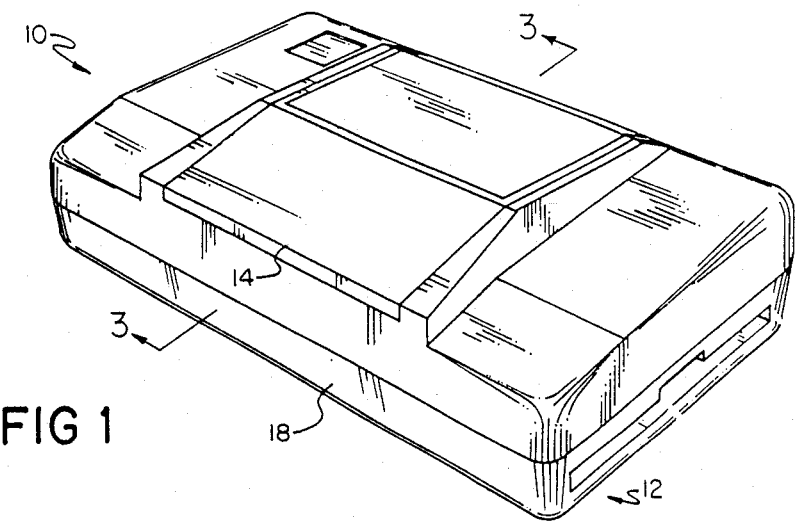
FIG. 1 is a perspective view of a folding single-lens-reflex print camera embodying features of the invention and showing the camera in closed position.
Figure 2:
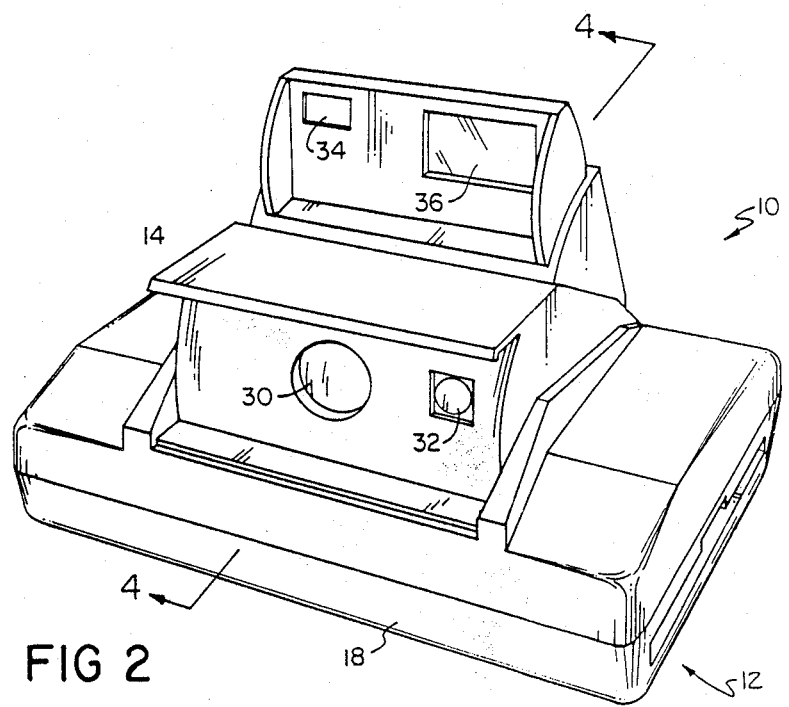
FIG. 2 is a perspective view of the camera in FIG. 1 in the open position.
Figure 3:
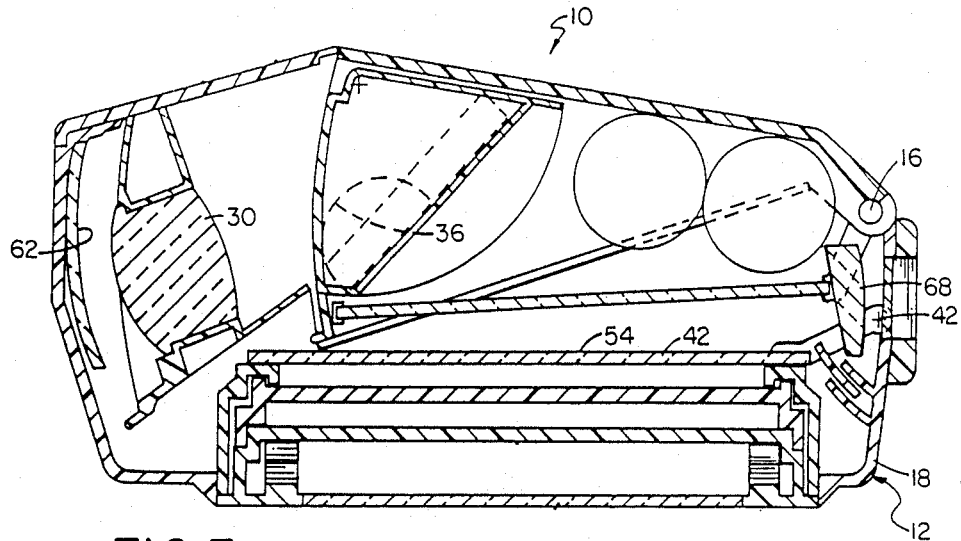
FIG. 3 is a cross-section 3—3 of the camera in FIG. 1.
Figure 4:
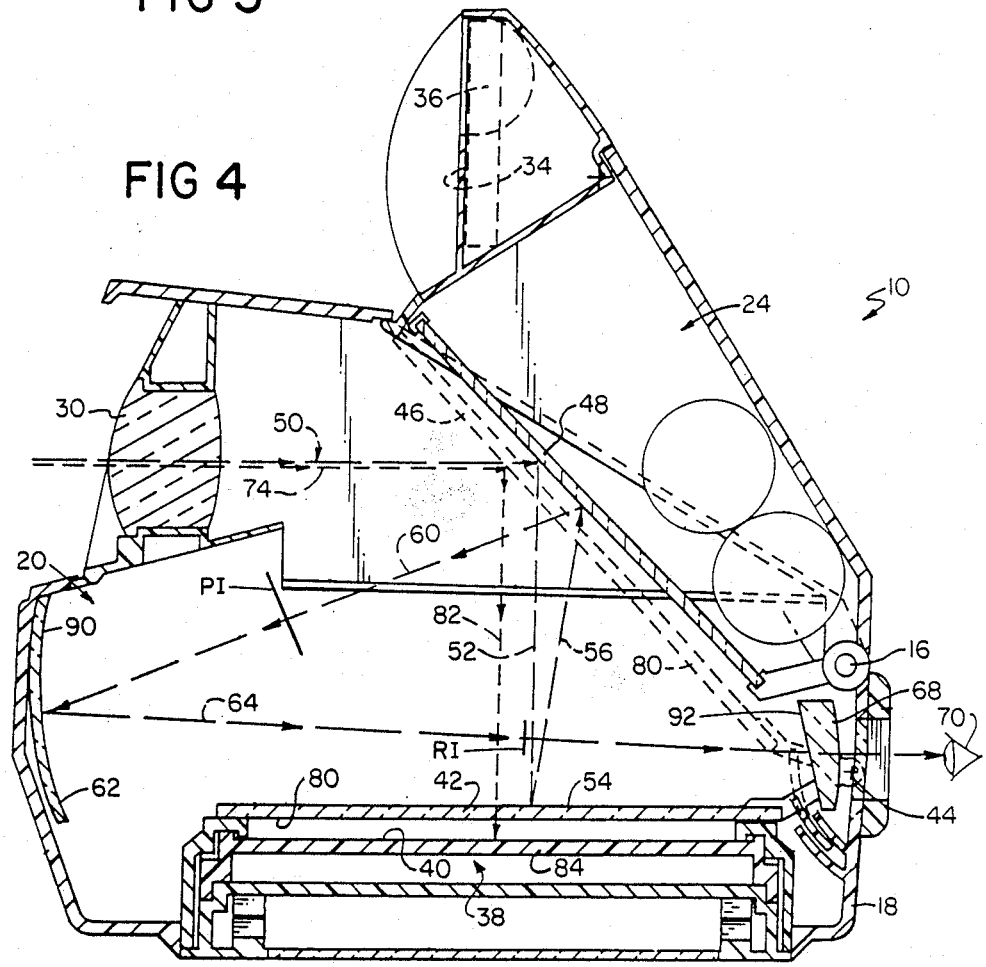
FIG. 4 is a cross-section 4—4 of the camera in FIG. 2.

In FIGS. 1 to 4, there is shown a camera 10 which includes a housing 12 that an operator moves from a closed position as shown in FIGS. 1 and 3 to an open position for taking a photograph as shown in FIGS. 2 and 4. During the opening action, an upper section 14 of housing 12 moves relative to the housing's lower section 18 by pivoting about a pin 16 to form an interior imaging chamber or camera chamber 20 and a flash and rangefinder chamber 24. (See FIG. 4.)

In the open position, the upper section 14 uncovers the camera's objective 30, an exposure controlling light sensor 32 (FIG. 2), a sonic rangefinder 34, and a flash unit 36. To arrive at the closed position, the upper section 14 pivots downwardly about the pin 16 into the imaging chamber 20 to form a compact unit as shown in FIGS. 1 and 3.

Under the imaging chamber 20, the lower section 18 of the housing 12 forms a film compartment 38 for receiving a print film pack which places a film at the photographic image plane 40 of the objective 30. A capping plate 42, upwardly articulatable about a pivot 44 covers film compartment 38 and, when "down" in its capping position, maintains the film compartment 38 in a light-tight condition. Capping plate 42 normally remains down in its capping position while the camera is open as in FIGS. 1 and 3 or closed as in FIGS. 2 and 4, including the time when a observer views a scene. Only when the photographer actuates a shutter button to expose film, does the camera mechanism swing the capping plate 42 about the pivot 44 to an inclined "up" position identified as 46 in phantom lines.

In the camera's open position shown FIGS. 2 and 4, before the photographer presses the shutter button and while the photographer views a scene with the capping plate 42 down, a fixed flat reflex mirror 48 reflects light rays, such as axial rays 50, passing through the objective 30 along a path 52 onto a Fresnel screen 54 on the upper surface of the capping plate 42. The fixed mirror 48 rests at a position such that the camera objective 30 focuses the light from the target scene to form a prime image at the Fresnel screen 54. Hence, a prime image plane exists at the Fresnel screen 54, slightly above the true photographic image plane 40. The Fresnel screen 54 redirects the light rays from the path 52 along an angular path 56 back to the flat reflex mirror 48 which in turn reflects the light along a path 60 toward a concave viewfinder mirror 62 of distorted shape. The concave mirror 62 reflects the light rays along a path 64 through an eye lens 68 toward the eye 70 of an observer. The observer can then compose the desired picture.

Fresnel screen 54 is shaped to act as a field lens and forms a conjugate image PI of the exit pupil of the objective lens 30 in the space between the flat reflex mirror 48 and the distorted mirror 62. Beyond the image of the pupil, PI, the rays diverge, and the concave mirror 62 collects and reimages them before the transverse section becomes overly large. The concave mirror 62 then forms an image, RI, of the scene in space conjugate to the prime image at the Fresnel screen 54 and between the concave mirror 62 and the eye lens 68. The real image, RI, of the target scene is substantially smaller than the format size of the prime image of the Fresnel screen 54 and hence of the print camera itself.

When the photographer actuates the shutter button (not shown), a between-the-lens shutter, which may be behind the lens and which is not shown, first closes to make the imaging chamber 20 light-tight. A camera mechanism, not shown, then swings the capping plate 42 about the pivot 44 into the position 46. The shutter then opens and light through the objective 30 passes along a path 74 coincident with the path 50 until it strikes a movable reflex mirror 80 on the lower face of the capping plate 42. The reflex mirror 80 reflects the light rays downwardly along the path 82 onto the sensitive film surface 84 of a film pack mounted in the compartment 38. When up, the reflex mirror 80 rests at a position in front of the reflex mirror 48 and relative to the objective 30 so that the objective 30 focuses the target scene onto the true image plane 40 at the plane of the film. When the between-the-lens shutter closes to end exposure of the film, the capping plate 42 pivots down to its capping position to cover the film and again make the compartment 38 dark. The shutter now opens and the observer is then again free to view a scene through the viewfinder.

To store the camera, the photographer closes it to the position shown in FIGS. 1 and 3.

Details of the viewfinder optical system including mirror 62 and eye lens 68 appear in FIG. 5 and 5A. As shown, the concave mirror 62 forms a front reflecting surface tilted upwardly to receive light along the path 60. The surface 90 is an aspheric surface shaped in accordance with the generalized polynomial expression:

$$\begin{aligned}Z = &-0.2747X^2 - 0.2639Y^2 \\ &+0.0190X^2Y + 0.0145Y^3 \\ &-0.0094X^4 - 0.0251X^2Y^2 + 0.00184Y^4 \\ &-0.0011X^4Y + 0.0252X^2Y^3 + 0.0004Y^5 \\ &+0.0570X^4Y^2 - 0.0204X^2Y^4 - 0.0134Y^6\end{aligned}$$

The term "generalized polynomial" is used in the sense of a fully generalized non-rotational expression that excludes a surface of revolution or portion thereof.

Light from the mirror 62 passes along the path 64 (FIG. 4) through lens 68. The front surface 92 of lens 68 is aspheric and shaped in accordance with a generalized polynomial expression, namely:

$$\begin{aligned}Z = &+0.315X^2 + 0.341Y^2 \\ &+0.276X^2Y + 0.256Y^3 \\ &+0.577X^4 + 1.316X^2Y^2 + 0.654Y^4 \\ &-0.065X^4Y + 0.335X^2Y^3 + 0.216Y^5 \\ &+0.0269X^4Y^2 + 0.049X^2Y^4 - 0.013Y^6\end{aligned}$$

The rear surface 94 of the lens 68 is spherical. According to one embodiment of the invention, the viewing system operates at 0.5× magnification over a camera lens format of 1.90×2.50 inches. The convex spherical rear surface 94 of the eye lens 68, adjacent the eye, defines a vertex V1, displaced 0.0157 inches downwards from a reference axis 96, and tilts up 14.12 degrees. That is, the axis of rotation, passing through V1, is sloping upward to the left. The reference axis 96 represents the coordinate horizontal line passing through the center of the pupil (and center of the eye), and serves as the Z-axis for the aforementioned equations. An axial ray 98 extends from the mirror 62 to the lens 68.

In this embodiment, the aforementioned polynomial defines the shape of the concave front surface 92 of the eye lens 68 with an origin (or vertex) V2 displaced downwards 0.0278 inches, and the normal through V2 sloping upward 7.66 degrees, relative to the reference axis 96. Since this slope is smaller than that at V1, the prism formed by the tangent planes of surfaces 92 and 94 of lens 68 refracts light upward after passage through both surfaces from a vertex V3 of the surface 90 of the concave mirror 62 which lies 0.187 inches above the reference horizontal axis 96 and 3.215 inches to the left of the vertex V2. The axis 96 lies 0.383 inches above the film plane 40.

The shape of the surface 92 is defined using 13 polynomial terms through the 6th order in X and Y, the minimum order needed for an acceptable state of correction. The polynomial terms contain only terms of even order in X. Further constant and linear terms are made unessential by use of tilt and displacement of V2. If included, however, they would produce 15 polynomial terms.

The camera housing 12 holds the concave mirror 62 with its concave surface 90 to the right and directs it slightly upward. The surface 90 uses 13 polynomial coefficients with tilt and displacement at V3 making the total 15 again. The reflected axis of rotation of the mirror at surface 90 is directed upward toward the observer at an angle of 6.94 degrees. Through the mirror at surface 90, the axis of rotation slopes upwards to the right, and the associated tilt angle is taken as positive (first and third quadrants). All terms in X are even ordered, and terms in X and Y are taken through the 6th order, again the required minimum for acceptable performance.

Eye lens 68 and concave mirror 62 image the pupil of the eye onto the image, PI, of the pupil of the objective 30. The Fresnel screen 54 always forms the image PI smaller than the exit pupil of the objective 30 so as to prevent occlusion.

For purposes of optimization one can work backwards. Pencils of light at the eye, seemingly arising from an object lying 60 inches to the right of V1 and centered on the Z reference axis, converge through the eye lens 68 toward the concave mirror 62 passing through image RI prior to striking it. The imaging effect of the concave mirror 62 refocuses the conjugate image RI onto the Fresnel plane and in so doing overcomes to a very large extent the inclination and, therefore, the foreshortening of the plane of the Fresnel screen 54 to the on-coming optical axis. The optimization therefore eliminates fairly exactly the trapezoidal effect of a square grid in object space (that is, what the eye is to see when used directly) imaged obliquely onto the plane of the Fresnel screen 54 by way of the offset concave mirror 62.

In the equations for both surface 92 of the eye lens 68 and for surface 90 of the concave mirror, the camera objective is taken to have a focal length of 82 mm from which the viewfinder produces an overall magnification of 0.5× relative to the real world.

The example is to be construed as generic, since the circumstances can be varied according to the focal length of the objective, the format size, and the several separations and tilts.

The embodiments disclosed offer access to the conjugate pupil image PI formed from the Fresnel screen. This overcomes the fact that the interposition of any stop or additional small element may likely be in the way of the oncoming light from camera lens to film via diagonal reflection.

The example discloses a tilt angle of 6.94 degrees at the surface 90 of the mirror 62. According to an embodiment of the invention good results are achieved at a tilt angle of 10 degrees. According to yet another example acceptable results can be achieved with a tilt angle at the vertex V3 of the mirror 62 not exceeding 20-degrees for useful applications for framing and viewing systems in conjunction with print photography.

According to still other embodiments, more elaborate viewing systems use a second tilt compensating means but with more than two components.

Another embodiment contemplates interpolation of a beamsplitter with little or no tilt angle, but with some loss of light and possibly ghost reflections.

Eye lens 68 not only helps to compensate for optical aberrations and a portion of the distortion but enables the observer to place his eye relatively close to the camera and to provide a visual field that can be accommodated over a range of observers.

The disclosed reflex viewing system doubly reflects the optical axis along the path 50, first at the Fresnel screen 54 more or less backwards along the paths 56 and 60 below the objective lens 30, and then forward once again along the path 64 from the vertex of the concave mirror 62. The optical axis goes through a zig-zag to clear the on-coming rays and to pass above the film pack or plate holder or roll film.

The objective lens 30 forms an erect but reverted initial image at the screen 54. Accordingly, the concave mirror 62 forms the image RI so it is erect and unreverted. The eyepiece 68 allows the eye 70 of the observer to come relatively close to the erect new image RI and forms a further virtual image sufficiently far away for the observer to accommodate the eye to adequately sharp focus and perception. This final virtual image then lies back toward the object scene, and the observer, in effect, looks toward the object scene but by way of the viewfinder.

For convenience the final optical axis of the viewfinder is parallel to the original optical axis, or inclined slightly toward some point of convergence lying, for example, 30 inches or so away. The parallax problem succumbs to the through-the-lens viewing. What the observer sees is substantially what is photographed at any object distance.

For convenience the exit pupil of the viewfinder lies well back of the eye lens 68, say, at 15 mm or more. This eye relief is sufficient to allow proper location of an observer's eye 70 along the final optical axis and is also sufficient for freedom of movement of the eye which may move in rotation as well as translation.

The invention avoids incorporation of still another optical element or aspheric wafer near the image of the exit pupil of the camera lens formed by the Fresnel screen 54. The embodiments disclosed achieve acceptable results with a viewfinder having only two components, the lens 68 and the mirror 62, by giving the concave mirror 62 a fully generalized, non-rotational shape described in a convenient way mathematically by a truncated power series with all terms represented, such that the simple sum of the exponents of the two independent variables lie in the range from 1 to 9. In matrix form this means that the usable terms form half of the matrix on one side of and including the diagonal terms of the matrix, those terms lying elsewhere having a higher sum of the two exponents per term. A truncated power series, or polynomial in two variables, provides for smooth representation of the optical shape of the concave mirror 62, with a vertex as origin of coordinates, lying at the point of intercept with the optical axis.

The tangent plane at the vertex V3 of the mirror 62 is located and tilted in the meridional plane of the camera so as to reflect the on-going optical axis toward the eyelens 68 either parallel to or nearly parallel to the original optical axis. The concave mirror 62 lies away from a pupil and away from an image surface. Optically, mirror 62 shares the properties of both objective lens and field lens; it receives light from the pupil PI and uses the light to form a live image RI preceding the eye lens 68. In turn, eye lens 68 also shares the functions of an objective lens and field lens; it forms the exit pupil of the viewing system with the desired eye relief and forms a virtual distant image of the object scene.

The disclosed embodiments help compensate for astigmatism and curvature of field, plus lateral chromatic aberration and provide good acuity.

The embodiments disclosed use an array of power series terms through the 6th order. Since the horizontal variable as seen in image space from the back of the viewfinder is the X-coordinate, then only terms in even orders of X can be present, owing to the right-left symmetry of the viewfinder about the central or meridional plane of the camera.

In the meridional or Y-direction, + is upwards, as seen by the observer looking from the back of the camera forward toward the object scene, all terms in Y through the 6th degree are present; then terms in X-square times respectively Y, Y-square, Y-cube, Y-fourth; then terms in X-fourth times respectively Y, Y-square; then finally, X-6th. There are no linear terms in either X or Y since the tangent plane at the vertex of the mirror is preset by the desired reflection of the optical axis. The second surface of eyelens 68 next to the eye is a spherical dioptric surface, possessing only toroidal power, tilt and displacement in the Y-direction, or 4 parameters in all.

While embodiments of the invention have been described in detail, it will be evident to those skilled in the art that the invention may be embodied in other ways without departing from its spirit and scope.

What is claimed is:

1. A camera comprising:
   image forming means for forming an image of an object to be photographed; and
   a viewfinder for viewing the image where said viewfinder consists essentially of:
   (a) a reflector with an aspheric surface and;
   (b) a lens with an aspheric surface and being optically coupled with said reflector, at least one of said aspheric surfaces being shaped in accordance with a generalized polynomial expression.

2. The camera as in claim 1 wherein two of said surfaces are aspheric, and said lens has prismatic power.

3. The camera as in claim 2 wherein each of said aspheric surfaces is shaped in accordance with a generalized polynomial expression.

4. The camera as in claim 1 wherein said at least one aspheric surface is shaped in accordance with a generalized polynomial expression having at least one non-zero, 6th-order term.

5. The camera as in claim 2 wherein one of said surfaces is shaped in accordance with a generalized polynomial expression having at least one non-zero 6th-order term.

6. The camera as in claim 3 wherein two of said surfaces are shaped accordance with a polynomial expression having at least one non-zero 6th-order term.

7. The camera as in claim 1 wherein said lens includes said aspheric surface and a spherical surface, said aspheric surface on said lens facing said reflector and the spherical surface being directed toward the eye of a prospective viewer.

8. The camera as in claim 2, wherein said lens includes one of said aspheric surfaces and a spherical surface, said aspheric surface on said lens facing said reflector and said spherical surface being directed toward the eye of a prospective viewer.

9. The camera as in claim 3 wherein said lens includes said aspheric surface and a spherical surface, said aspheric surface on said lens facing said reflector and said spherical surface being directed toward the eye of a prospective viewer.

10. The camera as in claim 4 wherein said lens includes one of said aspheric surfaces and a spherical surface, said aspheric surfaces on said lens facing said reflector and said spherical surface being directed toward the eye of a prospective viewer.

11. The camera as in claim 5 wherein said lens includes one of said aspheric surfaces and a spherical surface, said aspheric surface on said lens facing said reflector and said spherical surface being directed toward the eye of a prospective viewer.

12. The camera as in claim 6 wherein said lens includes one of said aspheric surfaces and a spherical surface, said aspheric surface on said lens facing said reflector and said spherical surface being directed toward the eye of a prospective viewer.

13. The camera as in claim 1 wherein said aspheric surface is shaped in accordance with the expression:

$$\begin{aligned} Z = &+0.315X^2 + 0.341Y^2 \\ &+0.276X^2Y + 0.256Y^3 \\ &+0.577X^4 + 1.316X^2Y^2 + 0.654Y^4 \\ &-0.065X^4Y + 0.335X^2Y^3 + 0.216Y^5 \\ &+0.0269X^4Y^2 + 0.049X^2Y^4 - 0.013Y^6. \end{aligned}$$

14. The camera as in claim 1 wherein one of said aspheric surfaces is shaped in accordance with the expression:

$$\begin{aligned} Z = &+0.315X^2 + 0.341Y^2 \\ &+0.276X^2Y + 0.256Y^3 \\ &+0.577X^4 + 1.316X^2Y^2 + 0.654Y^4 \\ &-0.065X^4Y + 0.335X^2Y^3 + 0.216Y^5 \\ &+0.0269X^4Y^2 + 0.049X^2Y^4 - 0.013Y^6 \end{aligned}$$

and the other of said surfaces is shaped in accordance with the expression:

$$Z = -0.2747X^2 - 0.2639Y^2 \\ +0.0190X^2Y + 0.0145Y^3 \\ -0.0094X^4 - 0.0251X^2Y^2 + 0.00184Y^4 \\ -0.0011X^4Y + 0.0252X^2Y^3 + 0.0004Y^5 \\ +0.0570X^4Y^2 - 0.0204X^2Y^4 - 0.0134Y^6.$$

15. The camera as in claim 2 wherein one of said aspheric surfaces is shaped in accordance with the expression:

$$Z = +0.315X^2 + 0.341Y^2 \\ +0.276X^2Y + 0.256Y^3 \\ +0.577X^4 + 1.316X^2Y^2 + 0.654Y^4 \\ -0.065X^4Y + 0.335X^2Y^3 + 0.216Y^5.$$

16. The camera as in claim 2 wherein one of said aspheric surfaces is shaped in accordance with the expression:

$$Z = +0.315X^2 + 0.341Y^2 \\ +0.276X^2Y + 0.256Y^3 \\ +0.577X^4 + 1.316X^2Y^2 + 0.654Y^4 \\ -0.065X^4Y + 0.335X^2Y^3 + 0.216Y^5 \\ +0.0269X^4Y^2 + 0.049X^2Y^4 - 0.013Y^6.$$

17. The camera as in claim 13 wherein said aspheric surface is on said lens.

18. The camera as in claim 14 wherein said aspheric surface is on said reflector.

19. The camera as in claim 2 wherein one of said aspheric surfaces is shaped according to the expression:

$$Z = +0.315X^2 + 0.341Y^2 \\ +0.276X^2Y + 0.256Y^3 \\ +0.577X^4 + 1.316X^2Y^2 + 0.654Y^4 \\ -0.065X^4Y + 0.335X^2Y^3 + 0.216Y^5 \\ +0.0269X^4Y^2 + 0.049X^2Y^4 - 0.013Y^6.$$

and the other of said aspheric surfaces is shaped according to the expression:

$$Z = -0.2747X^2 - 0.2639Y^2 \\ +0.0190X^2Y + 0.0145Y^3 \\ -0.0094X^4 - 0.0251X^2Y^2 + 0.00184Y^4 \\ -0.0011X^4Y + 0.0252X^2Y^3 + 0.0004Y^5 \\ +0.0570X^4Y^2 - 0.0204X^2Y^4 - 0.0134Y^6.$$

20. The camera as in claim 2 wherein the aspheric surface on said lens is shaped according to the expression:

$$Z = +0.315X^2 + 0.341Y^2 \\ +0.276X^2Y + 0.256Y^3 \\ +0.577X^4 + 1.316X^2Y^2 + 0.654Y^4 \\ -0.065X^4Y + 0.335X^2Y^3 + 0.216Y^5 \\ +0.0269X^4Y^2 + 0.049X^2Y^4 - 0.013Y^6.$$

and said aspheric surface on said reflector is shaped according to the expression:

$$Z = -0.2747X^2 - 0.2639Y^2 \\ +0.0190X^2Y + 0.0145Y^3 \\ -0.0094X^4 - 0.0251X^2Y^2 + 0.00184Y^4 \\ -0.0011X^4Y + 0.0252X^2Y^3 + 0.0004Y^5 \\ +0.0570X^4Y^2 - 0.0204X^2Y^4 - 0.0134Y^6.$$

21. The camera as in claim 13 wherein said lens includes the aspheric surface and a spherical surface, said aspheric surface on said lens facing said reflector and said spherical surface being directed toward the eye of a prospective viewer.

22. The camera as in claim 14 wherein said lens includes one of said aspheric surfaces and a spherical surface, said aspheric surface on said lens facing said reflector and said spherical surface being directed toward the eye of a prospective viewer.

23. The camera as in claim 20 wherein said lens includes one of the aspheric surfaces and a spherical surface, said aspheric surface on said lens facing said reflector and said spherical surface being directed toward the eye of a prospective viewer.

24. The camera as in claim 8 wherein said reflector includes the other of said aspheric surfaces, the other of the surfaces being concave relative to the other of said aspheric surfaces.

25. The camera as in claim 23 wherein said lens includes one of the aspheric surfaces and a spherical surface, said aspheric surface on said lens facing said reflector and said spherical surface being directed toward the eye of a prospective viewer, said reflector including the other of said aspheric surfaces, the other of the surfaces being concave relative to the other of said aspheric surfaces.

26. The camera as in claim 1 wherein said image forming means includes an objective with an exit pupil and means for defining an image plane.

27. The camera as in claim 26 wherein said lens and said reflector are optically coupled along a given path substantially parallel to said image plane.

28. The camera as in claim 26 wherein axial light from said objective is substantially parallel to said image plane and a mirror reflects the light onto sad image plane.

29. The camera as in claim 27 wherein axial light from said objective is substantially parallel to said image plane and a mirror reflects the light onto said image plane.

30. A viewfinder comprising:
image forming means for forming an image of an object to be photographed; and
a viewfinder for viewing the image comprising:
(a) a reflector with an aspheric surface; and
(b) a lens with an aspheric surface optically coupled with said reflector, at least one of said surfaces being shaped in accordance with a generalized polynomial expression.

31. The viewfinder as in claim 30 wherein each of said aspheric surfaces is shaped in accordance with a generalized polynomial expression.

32. The viewfinder as in claim 30 wherein said at least one aspheric surface is shaped in accordance with a generalized polynomial expression having at least one non-zero 6th-order term.

33. The viewfinder as in claim 30 wherein said lens includes the aspheric surface and a spherical surface, said aspheric surface on the lens facing said reflector and the spherical surface being directed toward the eye of a prospective viewer.

34. The viewfinder as in claim 31 wherein said lens includes the aspheric surface and a spherical surface, said aspheric surfaces on the lens facing said reflector and the spherical surface being directed toward the eye of a prospective viewer.

35. The viewfinder as in claim 32 wherein said lens includes one of said aspheric surfaces and a spherical surface, said aspheric surfaces on the lens facing said reflector and the spherical surface being directed toward the eye of a prospective viewer.

36. A viewfinder as in claim 30 wherein said aspheric surface is shaped in accordance with the expression:

$$Z = +0.315X^2 + 0.341Y^2$$
$$+0.276X^2Y + 0.256Y^3$$
$$+0.577X^4 + 1.316X^2Y^2 + 0.654Y^4$$
$$-0.065X^4Y + 0.335X^2Y^3 + 0.216Y^5$$
$$+0.0269X^4Y^2 + 0.049X^2Y^4 - 0.013Y^6.$$

37. The viewfinder as in claim 30 wherein one of said aspheric surfaces is shaped in accordance with the expression:

$$Z = +0.315X^2 + 0.341Y^2$$
$$+0.276X^2Y + 0.256Y^3$$
$$+0.577X^4 + 1.316X^2Y^2 + 0.654Y^4$$
$$-0.065X^4Y + 0.335X^2Y^3 + 0.216Y^5$$
$$+0.0269X^4Y^2 + 0.049X^2Y^4 - 0.013Y^6$$

and the other of said surfaces is shaped in accordance with the expression:

$$Z = -0.2747X^2 - 0.2639Y^2$$
$$+0.0190X^2Y + 0.0145Y^3$$
$$-0.0094X^4 - 0.0251X^2Y^2 + 0.00184Y^4$$
$$-0.0011X^4Y + 0.0252X^2Y^3 + 0.0004Y^5$$
$$+0.0570X^4Y^2 - 0.0204X^2Y^4 - 0.0134Y^6.$$

38. The viewfinder as in claim 36 wherein said aspheric surface is on said lens.

39. A viewfinder as in claim 37 wherein said aspheric surface is on said reflector.

40. The viewfinder as in claim 36 wherein said lens includes the aspheric surface and a spherical surface, said aspheric surface on the lens facing said reflector and the spherical surface being directed toward the eye of a prospective viewer.

41. The viewfinder as in claim 37 wherein said lens includes one of said aspheric surfaces and a spherical surface, said aspheric surface on the lens facing said reflector and the spherical surface being directed toward the eye of a prospective viewer.

42. A viewfinder for observing an image formed in a plane, said viewfinder consisting essentially of a distorted reflector and an eyelens separated from one another along an optical path, said reflector having a shape in accordance with a polynomial having at least one 6th order term in two Cartesian coordinates and operating to form, between itself and said eyelens, an intermediate image of the image to be viewed and said eyelens being operative to allow observation of said intermediate image.

43. The viewfinder of claim 42 wherein said eyelens includes at least one aspheric surface.

44. The viewfinder of claim 43 wherein said eyelens includes prismatic power.

* * * * *